United States Patent Office 2,985,663
Patented May 23, 1961

2,985,663
SUBSTITUTED IMIDAZOLIDINONE AND METHOD FOR THE CONTROL OF UNDESIRED VEGETATION

Marvin Carmack, Bloomington, Ind., and Raymond Wilson Luckenbaugh, Wilmington, Del., assignors to E. I. du Pont de Nemours and Company, Wilmington, Del., a corporation of Delaware No Drawing. Filed Apr. 16, 1958, Ser. No. 728,763

2 Claims. (Cl. 260—309.7)

This invention relates to a class of 1-alkyl-3-aryl-2-imidazolidinones, and to herbicidal compositions and methods employing these novel compounds.

The substituted imidazolidinones that have been found to possess outstanding herbicidal activity are those represented by the following formula:

(1)

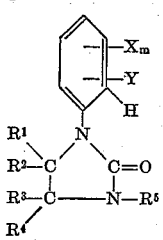

wherein X and Y are selected from the group consisting of hydrogen, halogen, nitro and alkyl groups containing less than 5 carbon atoms; $m$ is a positive integer less than 4, that is 1, 2 or 3; $R^1$, $R^2$, $R^3$ and $R^4$ are selected from the group consisting of hydrogen and methyl; and $R^5$ is an alkyl group containing less than 5 carbon atoms. $R^5$ is preferably methyl.

X and Y in Formula 1 above preferably are hydrogen or chlorine. Where the phenyl ring is substituted with 1 or more chlorines, the most preferred compounds are those in which there is chlorine on the para position of the benzene nucleus, relative to the benzene ring carbon that is attached to the imidazolidinone nitrogen.

The substituted imidazolidinones of the present invention can be prepared in accordance with the following series of reactions. While specific compounds are set forth in these reactions for illustration purposes, it is to be understood that any of the compounds of Formula 1 can be prepared by this route using appropriate reactants.

(2)

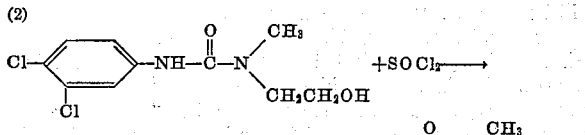

(3)

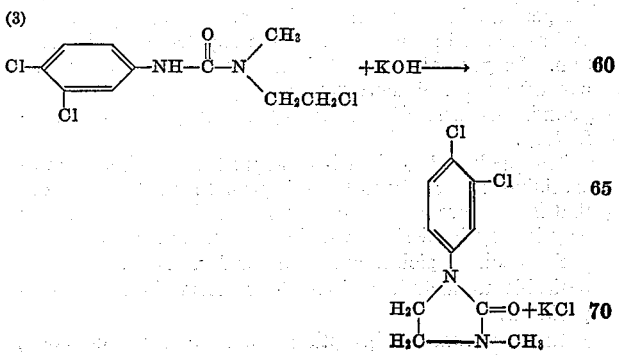

The phenyl hydroxyethyl methylureas employed in this reaction can be prepared in accordance with the procedure set forth in Searle and Todd U.S. Patent No. 2,663,729.

The reaction of Equation 2 can be carried out advantageously by first preparing a slurry of the substituted urea in an inert solvent such as benzene, toluene, xylene, dioxane, or ether, and then adding dropwise to the reaction mixture at room temperature a slight excess of an equimolar quantity of thionyl chloride. The rate of addition of the thionyl chloride and the temperature of the reaction mass are not critical, although 20 to 40° C. appears to give optimum results. The reaction mixture advantageously is stirred or heated until hydrogen chloride evolution practically ceases. The solvent is then removed, such as by evaporation in vacuum on a steam bath, yielding in essentially pure form the phenyl chloroethyl methylurea intermediate reaction product of Equation 2.

In place of the thionyl chloride, other conventional reagents for converting an alcohol to an alkyl halide can be used in the reaction of Equation 2. For example, zinc chloride and hydrochloric acid, phosphorus halides in pyradine, aqueous hydrobromic acid together with sulfuric acid, and the action of potassium or sodium iodide and phosphoric acid are suitable for this purpose.

In carrying out the reaction of Equation 3, the phenyl haloethyl methylurea intermediate prepared in accordance with Equation 2 is dissolved in alcohol and added rapidly to an equimolar quantity of potassium hydroxide dissolved in alcohol. This mixture is refluxed for several hours. The product can be isolated by cooling the reaction mixture, filtering the precipitate, and removing the salt from the precipitate by washing with water.

Other solvents or alkaline condensing agents can be used when carrying out the reaction of Equation 3. For example, such solvents as methanol, isopropanol, and methylal; and such alkaline condensing agents as sodium hydroxide and triethylamine can be employed.

An alternate method of preparing the compounds of the present invention is by the reaction of an aniline with an N-alkyloxazolidinone in accordance with the following equation:

(4)

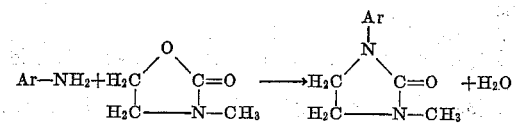

Also, the compounds of the present invention can be prepared by cyclizing an N-aryl-N'-alkylethylene-diamine with various agents, such as phosgene and alkali, diethyl carbonate, urea, or cyanogen halide with alkali, in accordance with the following equations:

(5)

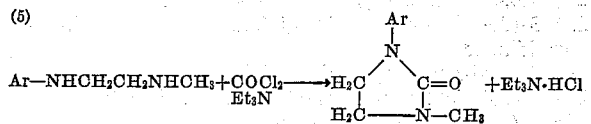

(6)

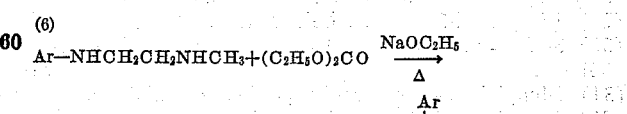

(7)

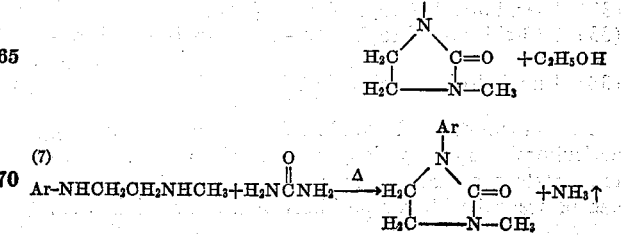

(8)

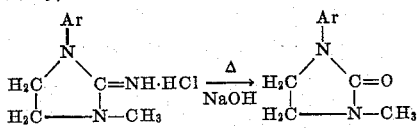

Still another method of preparing the compounds of the invention is by the alkylation of 2-imidazolidinones, in accordance with the following equations:

(9)
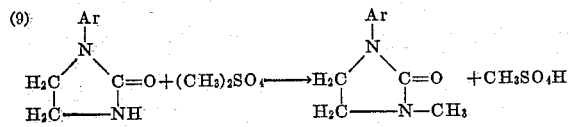

(10)
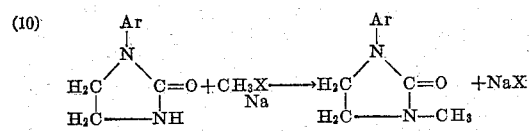

The substituted imidazolidinones of the present invention are crystalline solids that are characterized by low solubility in water. Illustrative of the compounds of the invention represented by Formula 1 above are the following:
(1) 1-methyl-3-phenyl-2-imidazolidinone
(2) 2-(p-chlorophenyl)-3-methyl-2-imidazolidinone
(3) 1-(3,4-dichlorophenyl)-3-methyl-2-imidazolidinone
(4) 1-(2,4,5-trichlorophenyl) - 3 - methyl-2 - imidazolidinone
(5) 1-methyl-3-(p-tolyl)-2-imidazolidinone
(6) 1-(p-cumenyl)-3-methyl-2-imidazolidinone
(7) 1-(p-sec. butylphenyl)-3-methyl-2-imidazolidinone
(8) 1-(p-bromophenyl)-3-methyl-2-imidazolidinone
(9) 1-(p-iodophenyl)-3-methyl-2-imidazolidinone
(10) 1-(p-fluorophenyl)-3-methyl-2-imidazolidinone
(11) 1-methyl-3-(3,4-xylyl)-2-imidazolidinone
(12) 1-(3-chloro-p-tolyl)-3-methyl-2-imidazolidinone
(13) 1-(3-chloro-p-cumenyl)-3-methyl-2-imidazolidinone
(14) 3,4-dimethyl-1-phenyl-2-imidazolidinone
(15) 1-(p-chlorophenyl)-3,4-dimethyl-2-imidazolidinone
(16) 1,4-dimethyl-3-phenyl-2-imidazolidinone
(17) 1-(3,4 - dichlorophenyl)-3,5-dimethyl-2-imidazolidinone
(18) 3-phenyl-1,4,4-trimethyl-2-imidazolidinone
(19) 3-(p-chlorophenyl)-1,4,4-trimethyl - 2 - imidazolidinone
(20) 1-(3,4 - dichlorophenyl)-3,4,4-trimethyl-2-imidazolidinone
(21) 1-(p-cumenyl)-3,4,4-trimethyl-2-imidazolidinone
(22) 3-(3,4-dichlorophenyl) - 1,4,5 - trimethyl - 2 - imidazolidinone
(23) 3-(p-tolyl)-1,4,5-trimethyl-2-imidazolidinone
(24) 1,4,4,5-tetramethyl-3-phenyl-2-imidazolidinone
(25) 3-(3,4-dichlorophenyl) - 1,4,4,5-tetramethyl-2-imidazolidinone
(26) 1-ethyl-3-phenyl-2-imidazolidinone
(27) 1-(3,4-dichlorophenyl)-3-ethyl-2-imidazolidinone
(28) 1-(p-cumenyl)-3-ethyl-2-imidazolidinone
(29) 1-isopropyl-3-phenyl-2-imidazolidinone
(30) 3-(3,4 - dichlorophenyl) - 1 - isopropyl-2-imidazolidinone
(31) 1-butyl-3-(3,4-dichlorophenyl)-2-imidazolidinone
(32) 1-sec. butyl-3-phenyl-2-imidazolidinone
(33) 1-(3-chloro-4-nitrophenyl) - 3 - methyl-2-imidazolidinone
(34) 1-methyl-(2-nitrophenyl)-2-imidazolidinone The compounds of Formula 1 are useful in defoliating agricultural crops, especially cotton. Crops such as cotton, potatoes, soy beans, sugar beets and like broadleaves can be treated with compositions of the invention when ready for harvesting. For example, cotton plants can be allowed to grow until such time as the bolls are ripening and ready to open. Then leaf-drying and even abcission can be instituted using the compounds of Formula 1.

In order to utilize the herbicidal activity of the compounds of the invention to best advantage, they are formulated by admixture with a carrier material or conditioning agent of the kind used and referred to in the art as a pest control adjuvant or modifier. This provides formulations adapted for ready and efficient application to soil, weeds, or unwanted plants using conventional applicator equipment. Thus, the herbicidal compositions of the invention are in the form of solutions, dusts, water dispersible powders, aqueous dispersions and emulsions.

Pest control adjuvants such as dusts, solvents, wetting, dispersing and emulsifying agents set out in U.S. Patent 2,655,445 can be employed in preparing the herbicidal compositions of the present invention. Other wetting, dispersing, and emulsifying agents such as those listed in detail in Bulletin E607 of the Bureau of Entomology and Plant Quarantine of the U.S. Department of Agriculture, and such as those set out in an article by McCutcheon in Chemical Industries, November 1947, page 811, entitled "Synthetic Detergents" can also be used. The preferred herbicidal compositions of the present invention are in the form of water dispersible powders. These can be prepared by admixing one or more of the substituted imidazolidinones with a surface-active dispersing agent and a finely divided solid carrier or dust such talc, pyrophyllite, natural clays, diatomaceous earths and other powdered diluents such as those set out in the aforementioned U.S. patent. The surface-active dispersing agent is used in amount sufficient to impart water dispersibility to the powder. Dust compositions can be prepared by admixing one or more of the substituted imidazolidinones with a finely divided carrier such as those set forth in the aforementioned U.S. patent.

Liquid herbicidal compositions can be prepared by intimately dispersing one or more of the substituted imidazolidinones in a conventional liquid herbicidal carrier, such as water or a herbicidal oil. For example, effective liquid compositions can be prepared by vigorously milling together a herbicidal oil such as kerosene and a substituted imidazolidinone. Such a liquid composition can be prepared in the form of a concentrate that can subsequently be extended with a herbicidal oil. If an emulsifier is included in the concentrate, it can also be extended to sprayable concentrations with water.

The content of substituted imidazolidinones in the herbicidal compositions of the invention will vary according to the manner in which and the purpose for which the composition is to be applied but, in general, will be from 0.5 to 95% by weight of the composition.

The herbicidal method of the present invention comprises applying a substituted imidazolidinone of Formula 1, ordinarily in a herbicidal composition of the aforementioned type, to the locus or area to be protected from undesirable plant growth. The active compound is, of course, applied in amount sufficient to exert the desired herbicidal action. The application can be made directly upon the locus or area and the vegetation thereon during the period of infestation or, alternatively, the application can be made in advance of an anticipated weed infestation. In general, rates of from about 15 to 40 pounds per acre for soil sterilization and from about 1 to 5 pounds per acre for pre-emergence crop use are satisfactory.

The preferred method is to apply the substituted imidazolidinones directly to the soil prior to weed infestation, that is, as a pre-emergence treatment. When used in this way it may be desirable to include other soil pesticides, such as soil fungicides and nematocides. Also, it may be desirable to include a fertilizer material in these compositions.

In order that the invention can be better understood, the following examples are given in addition to those set forth above:

Example 35

19.6 parts by weight of thionyl chloride is added dropwise over a period of 30 minutes to a mixture of 29.1 parts by weight of 1-(2-hydroxyethyl)-1-methyl-3-phenylurea and 200 parts by weight of benzene. The reaction is slightly exothermic and hydrogen chloride is evolved. After refluxing on a steam bath for 4 hours, hydrogen chloride evolution practically ceases. 1-(2-chloroethyl)-1-methyl-3-phenylurea is isolated by evaporation of the solvent as a viscous semi-solid, giving a 76% yield.

*Analysis.*—Calcd. for $C_{10}H_{13}ClN_2O$: N, 13.2; Cl, 16.7. Found: N, 13.13, 13.26; Cl, 17.41.

A sample of this impure substituted urea is then purified by crystallizing from ethanol-water to yield essentially pure crystalline 1-(2-chloroethyl)-1-methyl-3-phenylurea having a melting point of 99–100° C.

*Analysis.*—Calcd. for $C_{10}H_{13}ClN_2O$: N, 13.2; Cl, 16.7. Found: N, 13.20; Cl, 16.27, 16.17.

21.3 parts by weight of 1-(2-chloroethyl)-1-methyl-3-phenylurea is added gradually to a solution of potassium hydroxide containing 6.6 parts by weight of 85% potassium hydroxide in 125 parts of ethanol. The mixture is stirred and refluxed for two hours. The hot solution is filtered from the potassium chloride, and on cooling, 1-methyl-3-phenyl-2-imidazolidinone, 10.5 parts by weight, precipitates from the filtrate. The product is purified by two recrystallizations from n-hexane, M.P. 111–112° C.

*Analysis.*—Calcd. for $C_{10}H_{12}N_2O$: N, 15.9. Found: N, 15.81, 15.66.

This compound is formulated into a wettable powder of the following composition by combining the dry components, blending in a ribbon blender, micropulverizing in a hammer mill until substantially all of the product is below 50 microns in particle size and reblending the product in a ribbon blender:

| | Percent |
|---|---|
| 1-methyl-3-phenyl-2-imidazolidinone | 80 |
| Dry attapulgite | 18 |
| Alkyl aryl sulfonate | 1.75 |
| Methyl cellulose | 0.25 |

This wettable powder, when extended with water to form a sprayable formulation containing 1% by weight of the active ingredient and sprayed upon an area infested with Johnson grass and other annual and perennial weeds, gives excellent weed control.

Example 36

A mixture consisting of 60.0 parts by weight of 3-(3,4-dichlorophenyl) - 1 - (2-hydroxyethyl)-1-methylurea and 400 parts by weight of benzene is treated with 29.8 parts by weight of thionyl chloride in accordance with the procedure of Example 33. Crude 1-(2-chloroethyl)-3-(3,4-dichlorophenyl)-1-methylurea, 54.5 parts by weight, is isolated as a brown solid by evaporation of the benzene solvent.

A part of this crude solid is recrystallized from ethanol-water to give essentially pure 1-(2-chloroethyl)-3-(3,4-dichlorophenyl)-1-methylurea having a melting point of 91–92° C.

*Analysis.*—Calcd. for $C_{10}H_{11}Cl_3N_2O$: N, 9.97; Cl, 37.9. Found: N, 9.98, 9.93; Cl, 36.79, 36.90.

54.5 parts by weight of the thusly prepared 1-(2-chloroethyl)-3-(3,4-dichlorophenyl)-1-methylurea is dissolved in 75 parts of alcohol. This is added to a solution of 12.7 parts by weight of potassium hydroxide (85%) in 200 parts by weight of alcohol. The mixture is refluxed for two hours, cooled to 20° C., and filtered. Essentially pure 3-(3,4-dichlorophenyl)-1-methyl-2-imidazolidinone, 20 parts by weight, M.P. 157–157.5° C., is obtained after washing the potassium chloride from the precipitate with water.

*Analysis.*—Calcd. for $C_{10}H_{10}Cl_2N_2O$: C, 48.0; H, 4.08; Cl, 29.0; N, 11.4. Found: C, 48.62, 48.98, 48.68; H, 4.13, 4.29, 4.11; Cl, 28.03, 27.98; N, 11.21.

The thusly prepared substituted imidazolidinone is then formulated into the following dust herbicidal composition by mixing the active component with the absorptive diluent, micropulverizing the mixture, and then extending the mixture with the principal diluent followed by blending in a ribbon blender:

| | Percent |
|---|---|
| 3-(3,4-dichlorophenyl)-1-methyl-2-imidazolidinone | 10 |
| Dry attapulgite | 10 |
| Talc | 80 |

This herbicidal composition is then dusted by hand on the ground around a warehouse at a rate of 20 pounds/acre of the active ingredient. This treatment gives excellent weed control in the area.

Example 37

31 parts by weight of thionyl chloride is added dropwise over a period of 15 minutes to a mixture of 65 parts by weight of 3-(3,4-dichlorophenyl)-1-ethyl-1-(2-hydroxyethyl) urea and 500 parts of toluene. After storing at room temperature over night, the mixture is let stand several days. The oily bottom layer is then separated and the toluene removed by evaporation. The resulting 1-(2-chloroethyl)-3-(3,4-dichlorophenyl)-1-ethylurea (61 parts) is a viscous yellow oil, refractive index $N_D^{25}$ 1.5885.

The oil is dissolved in 80 parts of ethanol. To this solution there is added 13.4 parts of 85% potassium hydroxide in 200 parts of ethanol. The mixture is stirred and refluxed for 2 hours. The hot solution is filtered from the potassium chloride, and on cooling, 1-(3,4-dichlorophenyl)-3-ethyl-2-imidazolidinone, 24.5 parts by weight precipitates from the filtrate on cooling in an ice water bath, M.P. 107–108° C.

*Analysis.*—Calcd. for $C_{11}H_{12}Cl_2N_2O$: N, 10.8; Cl, 27.4. Found: N, 10.74, 10.98; Cl, 27.13, 27.15.

The thusly prepared substituted imidazolidinone is then formulated into the follow dust herbicidal composition by mixing the active component with the adsorptive diluent, micropulverizing the mixture, and then extending the mixture with the principal diluent followed by blending in a ribbon blender:

| | Percent |
|---|---|
| 1-(3,4-dichlorophenyl)-3-ethyl-2-imidazolidinone | 10 |
| Dry attapulgite | 10 |
| Talc | 80 |

This herbicidal composition is dusted by hand on the ground around a warehouse at a rate of 25 pounds/acre of the active ingredient. This treatment gives excellent weed control in the area.

Example 38

1 - (3,4-dichlorophenyl)-3-isopropyl-2-imidazolidinone is prepared in accordance with the procedure of Example 35 by substituting an equimolar quantity of 3-(3,4-dichlorophenyl)-1-isopropyl - 1 - (2-hydroxyethyl) urea for the 3-(3,4-dichlorophenyl)-1-ethyl-(2-hydroxyethyl) urea used in Example 37.

The thusly prepared substituted imidazolidinone is then formulated into the following dust composition in accordance with the procedure of Example 37.

| | Percent |
|---|---|
| 1 - (3,4-dichlorophenyl)-3-isopropyl - 2 - imidazolidinone | 10 |
| Dry attapulgite | 10 |
| Talc | 80 |

This composition, when applied to an area infested with common annual and perennial weeds gives excellent herbicidal control.

Example 39

1 - (3,4-dichlorophenyl)-3-n-butyl-2-imidazolidinone is prepared in accordance with the procedure of Example 37 by substituting an equimolar quantity of 3-(3,4-dichlorophenyl)-1-butyl-1-(2-hydroxyethyl) urea for the 3 - (3,4-dichlorophenyl)-1-ethyl - (2 - hydroxyethyl) urea used in Example 37.

The thusly prepared substituted imidazolidinone is then formulated into the following dust composition in accordance with the procedure of Example 37:

| | Percent |
|---|---|
| 1 - (3,4-dichlorophenyl)-3 - n - butyl - 2 - imidazolidinone | 10 |
| Dry attapulgite | 10 |
| Talc | 80 |

This composition, when applied to an area infested with common annual and perennial weeds gives excellent herbicidal control.

Example 40

24.7 parts by weight of 1-(2-chloroethyl)-3-(p-chlorophenyl)-1-methylurea is dissolved in 75 parts by weight of ethanol. This is added to a solution of 6.6 parts by weight of potassium hydroxide (85%) in 200 parts of ethanol. The mixture is refluxed for two hours, cooled to 20° C. and filtered. Essentially pure 1-(p-chlorophenyl)-3-methyl-2-imidazolidinone is obtained after washing the potassium chloride from the precipitate with water.

The thusly prepared substituted imidazolidinone is formulated into the following dust herbicidal composition in accordance with the procedure of Example 36.

| | Percent |
|---|---|
| 1 - (p - chlorophenyl) - 3 - methyl - 2 - imidazolidinone | 20 |
| Dry attapulgite | 20 |
| Pyrophyllite | 60 |

This herbicidal composition is then dusted by hand on a tennis court at a rate of 20 pounds/acre of the active ingredient. This treatment destroys the weeds growing on the tennis court and prevents the growth of new weeds for a prolonged time.

Example 41

1 - (2,4,5-trichlorophenyl) - 3 - methyl - 2 - imidazolidinone is prepared in accordance with the procedure of Example 38 by substituting 31.6 parts by weight of 1-(2-chloroethyl)-1-methyl-3-(2,4,5-trichlorophenyl) urea for the 24.7 parts by weight of 1-(2-chloroethyl)-3-(p-chlorophenyl)-1-methylurea of Example 40.

This substituted imidazolidinone is then formulated into the following pellet herbicidal composition by intimately mixing the components with a very small amount of water in a ribbon blender and extruding the resulting paste under high pressure through a 1/16 inch diameter die and cutting the extruded "worms" into 1/4 inch lengths:

| | Percent |
|---|---|
| 1 - (2,4,5-trichlorophenyl) - 3 - methyl - 2 - imidazolidinone | 25 |
| Hydrated attapulgite | 59 |
| Alkyl aryl sulfonate | 1 |
| Sodium sulfate, anhydrous | 15 |

These pellets are applied by hand at a rate of 20 pounds/acre of the active ingredient to the ground around scattered clumps of bindweed in a cultivated field. This treatment gives excellent control of the bindweed.

Example 42

1 - (p - cumenyl) - 3 - methyl - 2 - imidazolidinone is prepared in accordance with the procedure of Example 40 by substituting 25.5 parts by weight of 1-(2-chloroethyl)-3-(p-cumenyl)-1-methylurea for the 24.7 parts by weight of 1-(2-chloroethyl)-3-(p-chlorophenyl)-1-methylurea of Example 40.

This substituted imidazolidinone is formulated into the following oil suspension by ball milling the listed components for 45 minutes with the oil carrier.

| | Percent |
|---|---|
| 1 - (p-cumenyl)-3-methyl-2-imidazolidinone | 25 |
| Diesel oil | 75 |

This composition, when sprayed along a railroad right of way, gives excellent weed control.

Example 43

1-(p-bromophenyl)-3-methyl-2-imidazolidinone is prepared in accordance with the procedure of Example 38 by substituting 29.1 parts by weight of 3-(p-bromophenyl)-1-(2-chloroethyl)-1-methylurea for the 24.7 parts by weight of 1-(2-chloroethyl)-3-(p-chlorophenyl)-1-methylurea of Example 40.

This substituted imidazolidinone is formulated into the following granular herbicidal composition by first coating the beach sand with an aqueous sodium silicate solution and then adding the finely divided active ingredient, followed by mixing until a homogeneous mass is formed and then drying:

| | Percent |
|---|---|
| 1 - (p-bromophenyl)-3-methyl-2-imidazolidinone | 25 |
| Beach sand | 80.25 |
| Sodium silicate | 4.75 |

This composition, when applied by hand around mesquite bushes on range land, gives effective control of this weed.

Example 44

1-methyl-3-(3,4-xylyl)-2-imidazolidinone is prepared in accordance with the procedure of Example 40 by substituting 24.1 parts by weight of 1-(2-chloroethyl)-1-methyl-3-(3,4-xylyl) urea for the 24.7 parts by weight of 1-(2-chloroethyl)-3-(p-chlorophenyl)-1-methylurea of Example 40.

This substituted imidazolidinone is formulated into the following water dispersion herbicidal composition by vigorously milling the listed ingredients for 30 minutes in a sand mill:

| | Percent |
|---|---|
| 1 - methyl-3-(3,4-xylyl) - 2 - imidazolidinone | 35 |
| Hydrated attapulgite | 1.5 |
| Lignin sulfonate | 10.0 |
| Water | 53.0 |
| Sodium pentachlorphenate | 0.5 |

This composition is then applied by a tractor-mounted sprayer at the rate of 2 pounds/acre of active ingredient for control of weeds growing in an asparagus patch.

Example 45

1 - (3-chloro-p-cumenyl)-3-methyl-2-imidazolidinone is prepared in accordance with the procedure of Example 40 by substituting 28.9 parts by weight of 3-(3-chloro-p-cumenyl) - 1 - (2 - chloroethyl)-1-methylurea for the 24.7 parts by weight of 1-(2-chloroethyl)-3-(p-chlorophenyl)-1-methylurea of Example 40.

This substituted imidazolidinone is formulated into the following pellet herbicidal composition in accordance with the procedure of Example 41:

| | Percent |
|---|---|
| 1-(3-chloro-p-cumenyl)-3-methyl-2-imidazolidinone | 40 |
| Hydrated attapulgite | 39 |
| Alkyl aryl sulfonate | 1 |
| Sodium sulfate, anhydrous | 20 |

These pellets are scattered by hand at the rate of 20 pounds/acre of the active ingredient onto weed infested areas surrounding telephone poles. This treatment gives a substantially complete kill of the established vegetation and renders the area sterile for a prolonged period.

Example 46

3,4-dimethyl-1-phenyl-2-imidazolidinone is prepared in accordance with the procedure of Example 40 by substituting 22.6 parts by weight of 1-(2-chloro-1-methylethyl)-1-methyl-3-phenylurea for the 24.7 parts by weight of 1-(2-chloroethyl)-3-(p-chlorophenyl)-1-methylurea of Example 40.

This substituted imidazolidinone is formulated into the following wettable powder herbicidal composition in accordance with the procedure of Example 35.

|  | Percent |
|---|---|
| 3,4-dimethyl-1-phenyl-2-imidazolidinone | 50 |
| Talc | 47.5 |
| Alkyl aryl sulfonate | 1.5 |
| Lignin sulfonate | 1.0 |

This composition, when applied at the rate of 1.5 pounds of the active ingredient per acre, is effective as a pre-emergence treatment of corn fields.

Example 47

1-(3,4-dichlorophenyl)-3,5-dimethyl-2-imidazolidinone is prepared in accordance with the procedure of Example 40 by substituting 29.6 parts by weight of 1-(2-chloropropyl)-3-(3,4-dichlorophenyl)-1-methylurea for the 24.7 parts by weight of 1-(2-chloroethyl)-3-(p-chlorophenyl)-1-methylurea of Example 40.

This substituted imidazolidinone is formulated into the following granular herbicidal composition by first coating the ground vermiculite with an aqueous gum arabic solution and then adding the finely divided active ingredient, followed by mixing until homogeneous and drying:

|  | Percent |
|---|---|
| 1 - (3,4 - dichlorophenyl) - 3,5 - dimethyl - 2 - imidazolidinone | 10 |
| Ground vermiculite | 85 |
| Gum arabic | 5 |

This composition is applied at a rate of 20 pounds of active ingredient per acre by hand for control of weeds along a highway guard rail.

Example 48

3-(p-chlorophenyl)-1,4,4-trimethyl-2-imidazolidinone is prepared in accordance with the procedure of Example 38 by substituting 27.5 parts by weight of 1-(2-chloro-2-methylpropyl)-1-methyl-3-(p-chlorophenyl) urea for the 24.7 parts by weight of 1-(2-chloroethyl)-3-(p-chlorophenyl)-1-methylurea of Example 40.

This substituted imidazolidinone is formulated into the following oil dispersion herbicidal composition in accordance with the procedure of Example 42:

|  | Percent |
|---|---|
| 3 - (p - chlorophenyl) - 1,4,4 - trimethyl - 2 - imidazolidinone | 25 |
| Diesel oil | 75 |

This oil dispersion is applied by a knapsack sprayer at the rate of 20 pounds/acre of the active ingredient to weeds infesting an area around an oil storage tank. Excellent herbicidal control is obtained.

Example 49

1-methyl-3-phenyl-2-imidazolidinone is formulated into the following composition by dissolving the active ingredient in the mixture of xylene and aryl alkyl polyether alcohol:

|  | Percent |
|---|---|
| 1-methyl-3-phenyl-2-imidazolidinone | 20 |
| Aryl alkyl polyether alcohol | 5 |
| Xylene | 75 |

This concentrated composition is further diluted with water to a 1% by weight solution of the imidazolidinone and applied using a commercial spray apparatus to established cotton plants. Effective defoliation of the cotton plants results.

Example 50

1-(p-cumenyl)-3,4,4-trimethyl-2-imidazolidinone is prepared in accordance with the procedure of Example 40 by substituting 28.3 parts by weight of 1-(3-chloro-1,1-dimethylethyl)-3-(p-cumenyl)-1-methylurea for the 24.7 parts by weight of 1-(2-chloroethyl)-3-(p-chlorophenyl)-1-methylurea of Example 40.

This substituted imidazolidinone is formulated into the following dust herbicidal composition in accordance with the procedure of Example 36:

|  | Percent |
|---|---|
| 1-(p-cumenyl)-3,4,4-trimethyl-2-imidazolidinone | 10 |
| Dry attapulgite | 10 |
| Talc | 80 |

This dust formulation, when applied at the rate of 20 pounds/acre gives excellent control of established annual and perennial weeds.

Example 51

3 - (3,4 - dichlorophenyl) - 1,4,5-trimethyl-2-imidazolidinone is prepared in accordance with the procedure of Example 38 by substituting 31.0 parts by weight of 1-(2-chloro - 1 - methylpropyl) - 3 - (3,4 - dichlorophenyl)-1-methylurea for the 24.7 parts by weight of 1-(2-chloroethyl)-3-(p-chlorophenyl)-1-methylurea of Example 40.

This substituted imidazolidinone is formulated into the following water dispersion herbicidal composition in accordance with the procedure of Example 44.

|  | Percent |
|---|---|
| 3-(3,4-dichlorophenyl)-1,4,5-trimethyl-2-imidazolidinone | 40 |
| Hydrated attapulgite | 1.75 |
| Lignin sulfonate | 5.00 |
| Water | 52.75 |
| Sodium pentachlorphenate | 0.50 |

This composition, when extended with water to a 1% spray and applied at a rate of 3 pounds/acre of active ingredient to weeds growing in a sugar cane plot, gives excellent weed control.

Example 52

3 - (3,4-dichlorophenyl)-1,4,4,5-tetramethyl-2-imidazolidinone is prepared in accordance with the procedure of Example 40 by substituting 32.4 parts by weight of 1 - (2 - chloro - 1,2-dimethylpropyl)-3-(3,4-dichlorophenyl)-1-methylurea for the 24.7 parts by weight of 1-(2-chloroethyl)-3 - (p-chlorophenyl) - 1 - methylurea of Example 40.

This substituted imidazolidinone is formulated into the following pellet herbicidal composition in accordance with the procedure of Example 41:

|  | Percent |
|---|---|
| 3 - (3,4 - dichlorophenyl) - 1,4,4,5 - tetramethyl-2-imidazolidinone | 30 |
| Hydrated attapulgite | 55 |
| Sodium sulfate, anhydrous | 15 |

This composition, when applied by hand at a rate of 20 pounds of active ingredient per acre, gives control of weeds on a fire lane in a forest.

Example 53

1-(p-iodophenyl)-3-methyl-2-imidazolidinone is prepared in accordance with the procedure of Example 40 by substituting 33.9 parts by weight of 3-(p-iodophenyl)-1-(2-chloroethyl)-1-methylurea for the 24.7 parts by weight of 1-(2-chloroethyl)-3-(p-chlorophenyl)-1-methylurea of Example 40.

This substituted imidazolidinone is formulated into the following wettable powder heribicidal composition in accordance with the procedure of Example 35:

|  | Percent |
|---|---|
| 1-(p-iodophenyl)-3-methyl-2-imidazolidinone | 80 |
| Dry attapulgite | 18 |
| Alkyl aryl sulfonate | 1.75 |
| Methyl cellulose | 0.25 |

When this composition is sprayed from a railroad spray car at a rate of 20 pounds of active ingredient per acre, it gives control of weeds along a railroad right of way.

Example 54

1-(p-fluorophenyl)-3-methyl-2-imidazolidinone is prepared in accordance with the procedure of Example 40 by substituting 23.1 parts by weight of 3-(p-fluorophenyl)-1-(2-chloroethyl)-1-methylurea for the 24.7 parts by weight of 1-(2-chloroethyl)-3-(p-chlorophenyl)-1-methylurea of Example 40.

This substituted imidazolidinone is formulated into the following pellet herbicidal composition in accordance with the procedure of Example 41:

| | Percent |
|---|---|
| 1-(p-fluorophenyl)-3-methyl-2-imidazolidinone | 40 |
| Hydrated attapulgite | 39 |
| Alkyl aryl sulfonate | 1 |
| Sodium sulfate, anhydrous | 20 |

This composition is applied with a knapsack sprayer at a rate of one pound of active ingredient per acre for control of weeds in a grape vineyard.

Example 55

1 - (3 - chloro - 4 - nitrophenyl) - 3 - methyl - 2 - imidazolidinone is formulated into a wettable powder herbicidal composition in accordance with the procedure of Example 35.

| | Percent |
|---|---|
| 1 - (3 - chloro - 4 - nitrophenyl) - 3 - methyl - 2 - imidazolidinone | 80 |
| Dry attapulgite | 18 |
| Alkyl aryl sulfonate | 1.75 |
| Methyl cellulose | 0.25 |

The composition is extended with water. It is applied at a rate of 50 pounds of active ingredient per acre. Excellent control of annual weeds is obtained for example crabgrass, goosegrass, purslane, pigweed, chickweed, wild carrot and spinge. Also, control of perennial weeds as Quackgrass, Johnsongrass, and Bermuda grass is obtained.

We claim:

1. A method for the control of undesired vegetation comprising applying to the locus to be treated, in an amount sufficient to exert herbicidal action, the compound represented by the formula

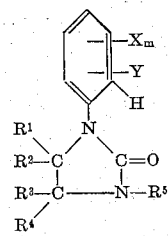

wherein X and Y are selected from the group consisting of hydrogen, halogen, nitro, and alkyl groups containing less than 5 carbon atoms; $m$ is a positive integer less than 4, that is, 1, 2 or 3; $R^1$, $R^2$, $R^3$ and $R^4$ are selected from the group consisting of hydrogen and methyl; and $R^5$ is selected from the group consisting of alkyl radicals containing less than 5 carbon atoms.

2. A substituted imidazolidinone represented by the formula

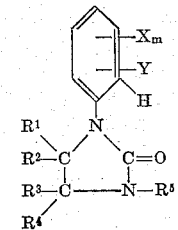

wherein X and Y are selected from the group consisting of hydrogen, halogen, nitro, and alkyl groups containing less than 5 carbon atoms; $m$ is a positive integer less than 4, that is, 1, 2 or 3; $R^1$, $R^2$, $R^3$ and $R^4$ are selected from the group consisting of hydrogen and methyl; and $R^5$ is selected from the group consisting of alkyl radicals containing less than 5 carbon atoms.

References Cited in the file of this patent

UNITED STATES PATENTS

| 2,518,264 | Abramovitch | Aug. 8, 1950 |
| 2,558,762 | Kohr et al. | July 3, 1951 |
| 2,709,648 | Ryken et al. | May 31, 1955 |